United States Patent Office 3,436,414
Patented Apr. 1, 1969

3,436,414
ORGANOLEAD CYANOGUANIDINE COMPOUNDS
AND A METHOD FOR MAKING THEM
Calvin J. Worrel, Detroit, Mich., assignor to International Lead Zinc Research Organization, Inc., New York, N.Y., a corporation of New York
No Drawing. Filed Dec. 13, 1966, Ser. No. 601,347
Int. Cl. C07f 7/24
U.S. Cl. 260—437                8 Claims

ABSTRACT OF THE DISCLOSURE

N-(trialkylplumbyl)cyanoguanidines and dicyanoguanidines and N-(triaromaticplumbyl)cyanoguanidines and dicyanoguanidines are novel organolead compounds wherein the tetravalent lead is attached to carbon and nitrogen. These compounds are prepared by reacting cyanoguanidine or dicyanoguanidine with trialkyl or triaromatic lead hydroxides in an organic solvent. The compounds are useful as antiwear additives for lubricants.

---

This invention is related to novel organolead compounds and a process for their preparation. More specifically, this invention is related to N-(trialkylplumbyl) and N-(triaromaticplumbyl)cyanoguanidines and dicyanoguanidines and to a process of preparing same.

An object of this invention is to obtain novel organolead compounds. Another object is to provide a process for preparing said novel compounds. Still other objects will become apparent from the following disclosure and the claims.

The objects of this invention are accomplished by providing organolead compounds having the following formulae:

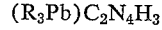

$(R_3Pb)C_2N_4H_3$

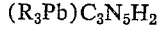

$(R_3Pb)C_3N_5H_2$ wherein R is a hydrocarbon group having up to about 12 carbon atoms and is selected from alkyl, aryl, alkaryl and aralkyl.

Illustrative examples of the novel compounds of this invention are N-(trimethylplumbyl)cyanoguanidine, N-(triethylplumbyl)cyanoguanidine, N-(tributylplumbyl)-cyanoguanidine, N-(triisobutylplumbyl)cyanoguanidine, N-(tri-n-octylplumbyl)cyanoguanidine, N-(tri-n-dodecylplumbyl)cyanoguanidine, N-(triphenylplumbyl)cyanoguanidine, N-(tritolylplumbyl)cyanoguanidine, N-[tri(2,4-dipropylphenyl)plumbyl]cyanoguanidine, N-[tri(3-phenylpentyl)plumbyl]cyanoguanidine, N-(tripropylplumbyl)dicyanoguanidine, N-(tridodecylplumbyl)dicyanoguanidine, N-(triisoamylplumbyl)dicyanoguanidine, N-(triphenylplumbyl)dicyanoguanidine, N-(tritolylplumbyl)dicyanoguanidine, N-[tri(4-phenylpentyl)plumbyl]dicyanoguanidine, and the like.

The above-described compounds are prepared by the methods described in the following examples wherein all parts are by weight.

Example 1

To a solution of 15.25 parts of triethyllead hydroxide in 200 parts of methanol stirred in a reaction vessel at room temperature under nitrogen was added 4.2 parts of solid cyanoguanidine. After stirring 16.5 hours at room temperature, the reaction mixture was filtered and the filtrate evaporated to dryness. The residue, a white solid weighing 14.9 parts, was dissolved in hot absolute ethanol from which unreacted cyanoguanidine precipitated on cooling. The alcohol solution was then evaporated, yielding 10.3 parts of N-(triethylplumbyl)cyanoguanidine which decomposed above 260° C. without melting.

Calculated lead _____ 54.89
Found by X-ray emission _____ 52.4

Example 2

Employing the procedure described in Example 1, N-(tributylplumbyl)cyanoguanidine was prepared by reacting tributyllead hydroxide with cyanoguanidine. The product was a yellow viscous oil. The identity of the product was confirmed by an infrared analysis (N—H bands at 3400–3100 cm.$^{-1}$; C≡N bands at 2140 cm.$^{-1}$; C=N bands at 1600 cm.$^{-1}$; C—N bands at 1420 cm.$^{-1}$;) and by lead analysis (flame spectroscopy method). Calculated for $C_{14}H_{30}N_4Pb$: 44.9 percent. Found: 45.7 percent.

Example 3

Employing the procedure described in Example 1, N-(triphenylplumbyl)cyanoguanidine is prepared by reacting triphenyllead hydroxide with cyanoguanidine in methanol.

Similarly, employing the above-described procedure, N-(triisobutylplumbyl)cyanoguanidine, N-[tri(2,4-diethylphenyl)plumbyl]cyanoguanidine, and N-[tri(3-phenylpentyl)plumbyl]cyanoguanidine are prepared by reacting respectively triisobutyllead hydroxide, tri(2,4-diethylphenyl)lead hydroxide, and tri(3-phenylpentyl)lead hydroxide with cyanoguanidine in methanol.

Example 4

Employing the procedure described in Example 1, N-(triethylplumbyl)dicyanoguanidine is prepared by reacting triethyllead hydroxide with dicyanoguanidine in ethanol.

Similarly, N-triisoamylplumbyl)dicyanoguanidine, N-(tridodecylplumbyl)dicyanoguanidine, N-(triphenylplumbyl)dicyanoguanidine, N-tritolylplumbyl)dicyanoguanidine and N-[tri(3-phenylhexyl)plumbyl]dicyanoguanidine are prepared by reacting respectively triisoamyllead hydroxide, tridodecyllead hydroxide, triphenyllead hydroxide, tritolyllead hydroxide, and tri(3-phenylhexyl)-lead hydroxide with dicyanoguanidine in ethanol.

The process is carried out by merely mixing the reactant in a suitable solvent. Preferably the guanidine reactant is added to the reaction vessel containing the lead compound and a solvent although this is not critical.

A variety of organic solvents may be employed. Applicable solvents are lower aliphatic alcohols such as methyl alcohol, ethyl alcohol, propyl alcohol, isopropyl alcohol, butyl alcohol, and the like; methyl cellosolve (ethylene glycol monomethyl ether); ethers, such as dimethyl ether; diethyl ether, dimethyl ether of ethylene glycol and the like; dioxane, tetrahydrofuran and the like.

The reaction should be carried out at a temperature high enough to promote the reaction, but not so high as to cause the decomposition. A preferred range is from 0–150° C. A more preferred range is from 10–100° C. A most preferred range is from 15–40° C.

The reaction can be carried out below or above atmospheric pressure. Preferably the reaction is conducted at atmospheric pressure.

The reaction should be carried out long enough to form a substantial yield of the desired product. A preferred time is from 1–24 hours. In the majority of cases the reaction is completed in from 8–16 hours.

The products can be recovered by conventional means such as solvent extraction and crystallization.

These are illustrated in the examples.

The above compounds have been found to be highly valuable as additives to lubricating oils particularly hydrocarbon oils for the purpose of preventing abrasive wear and scuffing or seizure under boundary lubrication conditions. They may also be used with similar effect in greases.

While the compounds of the invention are valuable lubricating oil additives, per se, their action is enhanced to a considerable degree by the addition of a phenolic type of antioxidant, e.g., 4,4'-methylenebis(2,6-di-tert-butylphenol). The antioxidant also has beneficial effect of increasing the solubility of the lead nitrogen compounds of this invention, thus enabling compounds that otherwise are too sparingly soluble in the oil to be used.

In the table below are shown results when a mineral oil with and without a compound of this invention was tested in the Shell 4-Ball Wear Tester, a known device, using 52,100 steel balls at 50° and 125° C.; at a speed of 1800 r.p.m., and 15 kg. load. Wear time is the time in minutes required to produce a 0.47 mm. diameter scar.

TABLE

|  | Wear time, minutes | |
| --- | --- | --- |
|  | 50° | 125° |
| No additive | 18 | 11 |
| With 1.0% Pb as N-(tributylplumbyl)cyanoguanidine | 3,000 | 220 |

Another use for the compounds of this invention is as a metal plating agent, whereby a compound is decomposed yielding a fine deposit of lead. Furthermore, these compounds may also be used as intermediates in preparing other organolead compounds.

Having fully described the novel compounds of this invention, their method of preparation, and the many utilities therefor, I desire to be limited only within the lawful scope of the appended claims.

I claim:

1. An organolead compound having a formula selected from the group consisting of $(R_3Pb)C_2N_4H_3$ and $(R_3Pb)C_3N_5H_2$ wherein R is a hydrocarbon group having up to 12 carbon atoms and is selected from the group consisting of alkyl, aryl, aralkyl and alkaryl and wherein $C_2N_4H_3$ is the cyanoguanidine radical and $C_3N_5H_2$ is the dicyanoguanidine radical.

2. N-(trialkylplumbyl)cyanoguanidine of claim 1 having the formula $(R_3Pb)C_2N_4H_3$.

3. The compound of claim 2 wherein said alkyl group is butyl.

4. The compound of claim 2 wherein said alkyl group is ethyl.

5. A method for preparing the compound of claim 1, said method comprising reacting a hydroxide having the formula $R_3PbOH$ wherein R is a hydrocarbon group selected from the group consisting of alkyl, aryl, aralkyl and alkaryl, with a guanidine compound selected from the group consisting of cyanoguanidine and dicyanoguanidine, said reaction being carried out in an organic solvent.

6. The process of claim 5 wherein R is an alkyl group.

7. The process of claim 6 wherein said alkyl group is butyl, yielding N-(tributylplumbyl)cyanoguanidine.

8. The process of claim 6 wherein said alkyl group is ethyl, yielding N-(triethylplumbyl)cyanoguanidine.

References Cited

UNITED STATES PATENTS

| 1,949,485 | 3/1934 | Migrdichian et al. | 260—435 |
| 2,640,006 | 5/1953 | Ligett et al. | |
| 2,674,519 | 4/1954 | Shapiro et al. | 260—437 XR |
| 2,893,857 | 7/1959 | De Ree | 260—437 XR |

FOREIGN PATENTS

| 553,406 | 5/1943 | Great Britain | 260—437 |

OTHER REFERENCES

Heap and Saunders, J. Chem. Soc., pp. 2983–2988 (1949). (Copy in 260/437).

Saunders and Stacey, J. Chem. Soc., pp. 919–925 (1949). (Copy in 260—437).

TOBIAS E. LEVOW, *Primary Examiner.*

H. M. S. SNEED, *Assistant Examiner.*

U.S. Cl. X.R.

252—49.7; 117—107.2